Feb. 14, 1939. W. DOBLHOFF 2,146,943
SPRING ARRANGEMENT
Filed Dec. 24, 1935 2 Sheets-Sheet 1
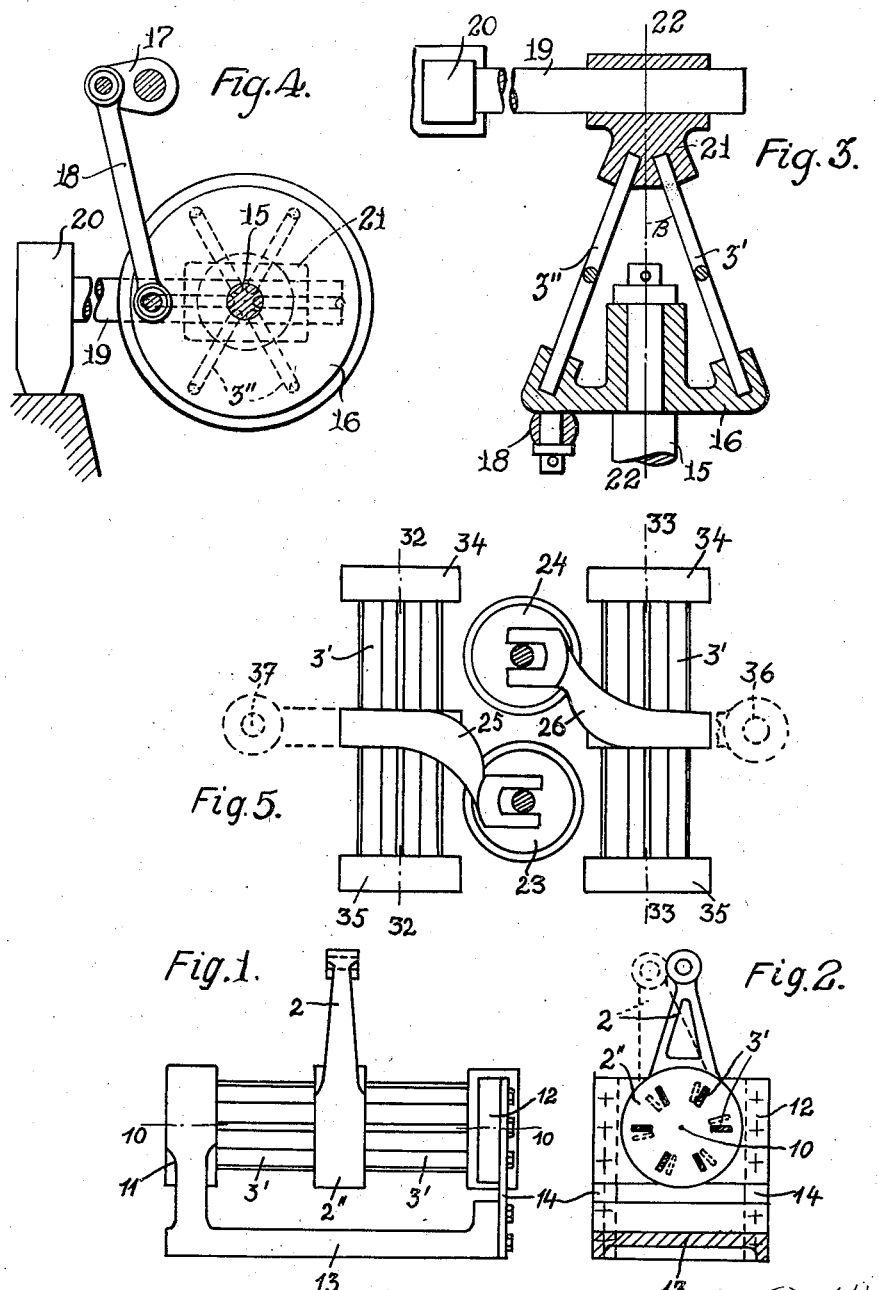

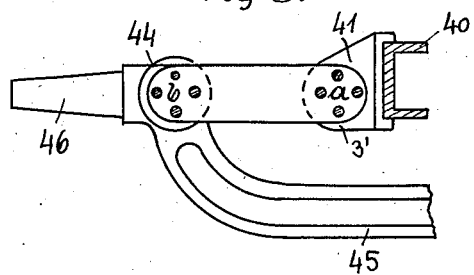
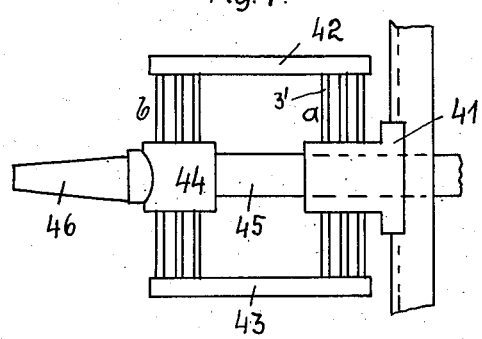
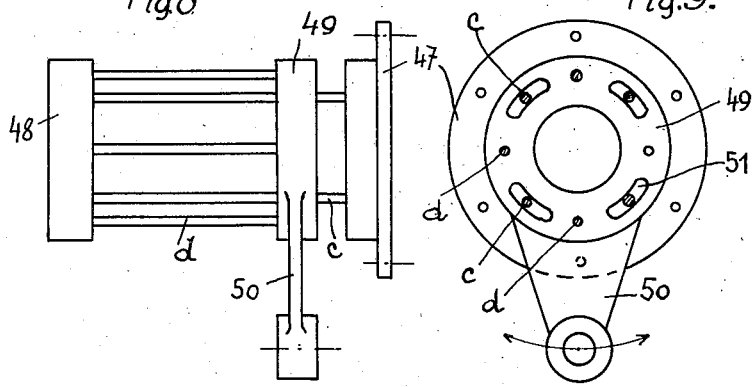

Patented Feb. 14, 1939

2,146,943

UNITED STATES PATENT OFFICE 2,146,943

SPRING ARRANGEMENT

Walther Doblhoff, Vienna, Austria

Application December 24, 1935, Serial No. 56,097
In Austria January 2, 1935

11 Claims. (Cl. 267—19)

This invention relates to a spring arrangement for all kinds of oscillating parts of machines, wherein neither a continuous shaft nor pins or bearings are used. According to the invention, at least three bar springs of any desired cross-section are arranged about a hypothetical axis of oscillation of the respective machine part so that they are intersected by a plane perpendicular to the hypothetical axis of oscillation and connect this machine part with a member (a bearing frame or with a second machine part) in such a manner that they counteract the intended oscillating motion and during oscillation are stressed at least in an essential part in bending, while they are unyielding with respect to any other motion or they are unyielding to any desired extent, that is to say they effect the mounting of the machine part.

The bar springs intersect or cross the hypothetical axis of oscillation at an acute angle, or they extend parallel to the axis. The said unyieldingness can be obtained especially in that the bar springs receive an edge-on cross section radial to the hypothetical axis of oscillation.

The bar springs may be arranged in such a manner that they engage with one end the oscillating machine part and with the other end the said member or that they engage with both ends the said member and the interposed oscillating machine part or finally that they engage with both ends the oscillating machine part and the interposed member. Any member, in which both ends of the bar springs are mounted, can be yieldingly designed in the direction of the bar springs in order to permit the shortening of the springs when the springing takes place. Moreover, the bar springs may be rotatably mounted at least at one end on their longitudinal axis in order to ensure the favorable bending stress of the springs. The bar springs may also be arranged in one or several rotary surfaces around the hypothetical axis.

The springs may be employed for obtaining a frictionless manner of pivotal mounting, even in cases in which the springing is not intentional, but is admissible. When highly tensioned edge-on cross-sections are used for the springs, a very firm mounting may be obtained with a small spring force.

Through the above mentioned arrangement of the spring bars to the hypothetical axis alone or in combination with a suitable selection of the spring cross-section and of the initial stressing or bending of the bar springs the ratio of displacement to load of the spring arrangement may be influenced within wide limits. Thus, the force in the vicinity of the stretched position of the spring bars is approximately proportional to the deflection, and as the bending of the springs increases the force increases more rapidly with the same increase in deflection. An amount of initial bending of the springs, such that within the range of normal loading they just become straight, gives a proportional ratio of displacement to load and any other initial bending or stressing a progressive ratio of displacement to load. If the moment of resistance of the spring bars normal to the spring direction be considerably greater than in that direction, then, owing to the occurrence of additional strains in the direction normal to the main springing, this increase in the spring force will be greater as the deflection increases. The crossing of the spring bar axes with the axis of rotation causes the occurrence of greater spring forces and so on.

All these means, employed singly or jointly, allow of an almost unlimited choice of the ratio of displacement to load of the springing arrangement according to the invention.

Figs. 1 to 9 of the accompanying drawings illustrate various constructional examples of the invention.

In the example shown in Figs. 1 and 2 (elevation and cross-section) a plurality of leaf springs 3' is arranged about a hypothetical axis 10, parallel to the same in a cylindrical surface, with the greatest dimension of the cross-section disposed radially to this hypothetical axis. These leaf springs are supported at both ends in bearing members 11, 12 of a support 13 and are rigidly connected between the two bearing members with the hub 2" of the swinging arm 2, extending through the same. Instead of springs extending right through, springs may be used, which act from both sides on the swinging part. The arrangement may also be the converse one (the middle on the stationary part and the ends on the moveable part) and instead of flat springs square or round bar springs may be used.

In such a spring arrangement one end of the springs is suitably yieldingly supported, for making possible a greater bending of the springs. In the example shown the springs 3' are, for instance, fixed in the two bearing members 11, 12 and the bearing member 12 is yieldingly connected to the support 13, for instance by strong leaf springs 14. Instead of this only one spring end may be fixed or at least prevented from working out and the other spring end may be made slidable in a stationary bearing part and may be so arranged as to turn about its longitudinal axis. This rotatable mode of support may also be provided at both ends of the springs.

The effect of the spring arrangement is such that, on the swinging arm 2 oscillating, the leaf springs 3' are bent between the two supporting places in both directions of rotation, the yielding supporting member 12 compensating the shortening of the springs caused by the greater amount of swing.

In this constructional form the bar springs 3' may be grouped in a plurality of cylindrical surfaces arranged next to one another or one within the other, preferably concentrically.

The leaf springs 3' also take up the weight of the swinging arm 2, that is they support the latter without the aid of a pivotal shaft. For this they are well suited with any cross-section of spring, but more particularly with the greatest dimension of the cross-section placed radially, since they will then oppose to any force directed radially towards the hypothetical axis a considerably greater resistance than when turning about the hypothetical axis, when they will be bent about the small side of the cross-section.

It is however also possible so to arrange the bar springs that they will offer only a small resistance to any radially directed forces.

Figs. 3 and 4 show as a further example a spring hammer in elevation and horizontal section. On a shaft 15 is mounted a disc 16 which has an oscillating motion imparted to it by a crank drive 17, 18. The block 21 supporting the hammer part 19 with the hammer 20 is connected to the oscillating disc 16 by a plurality of bar springs 3'' of for instance circular cross-section, which are arranged about a hypothetical oscillating axis 22—22 at an acute angle β to the same, that is in a conical surface. The springs 3'' are fixed in both bodies 16, 21, either permanently or so as to be removable.

The bar springs 3'' together carry the weight of the hammer and are twisted, more particularly when the hammer strikes, about the hypothetical axis 22—22, being subjected to bending stresses.

In this constructional form the springs 3'' may also be grouped in a plurality of conical surfaces which are arranged next to one another or one within the other, preferably concentrically.

Fig. 5 shows a modification of the spring arrangement in plan view, in which the swinging arm 25 or 26 of each valve 23 or 24 engages, similarly to the arrangement shown in Figs. 1 and 2, approximately in the middle of bar springs 3' which are arranged about a hypothetical axis 32 and 33 respectively, parallel to the latter, and are so held at both ends in bearing parts 34, 35 that they can bend, when the arm 25 or 26 is rocked. When the levers 25, 26 are suitably constructed as two-armed levers, a push bar for instance may engage at their other ends 36 and 37 respectively, which serves for actuating (opening) the valve from the cam shaft. This arrangement does away with the bearings and consequently the necessity of lubrication for the valve operating means.

The spring arrangement described is applicable to swinging machine parts of all kinds. Besides the examples described it is also applicable for instance to the swinging axles of motor vehicles, to the hammers or flap valves of musical instruments, to the spring loaded poles of ratchet wheels and so on, and in each individual case provides the advantage of a cheap, space-saving arrangement, to which may be added the replacement of the pivotal shaft by the springs. As the spring effect is obtained by a plurality of elements arranged in parallel, any danger due to breakage is practically eliminated, in contradistinction for instance to vehicle springs arranged in the usual way, which entirely cease to function, when the main leaf breaks. On a single bar spring ceasing to function, the spring force is reduced only by that amount, without the whole system being put out of operation. The safety is still further increased by the fact that spring arrangements according to the invention can be constructed with very little stressing of the material in the springs.

It is also possible to connect two or more of the described spring arrangements or spring groups with one another by one or more moveable elements which take up the shortening of the bar springs caused by their bending.

In Figs. 6 to 9 two constructional examples of such an arrangement are shown.

Figs. 6 and 7 show by way of example the springing of the axle of a motor vehicle with respect to the vehicle frame, Fig. 6 being a cross-section through the frame and Fig. 7 a plan view.

On the vehicle frame 40 is mounted by means of the arm 31 a plurality of parallel bar springs 3' about in the middle of their length, which forms the spring group a. At a distance from this group a of bar springs there is arranged parallel to it a second similar group b of bar springs. Both groups of bar springs are connected with one another at their ends by two, for instance plate-like elements 42, 43. About in the middle of the group b of bar springs there engages a part 44 of the vehicle axle 45 which is to be sprung, the part 44 also carrying the stub shaft 46 for the vehicle wheel.

On the spring arrangement coming into action, the bar springs of the two spring groups a, b bend and the plate-like elements 42, 43 approach one another. This arrangement provides a double or multiple arrangement of the spring device according to the invention, which occupies a relatively small space.

Figs. 8 and 9 show a second constructional example in elevation and cross-section.

From a supporting part fixed to a frame, for instance from a ring 47 or the like, there extends a plurality of parallel bar springs, which springs form one spring group c and are connected with one another at their end by a for instance ring-shaped element 48. To the element 48 are also connected the ends of the bar springs of a second group d of bar springs, which group extends back towards the supporting member 47 and is connected at its other end with the ring-like part 49 of a swinging lever 50 which is to be supported and sprung by means of the spring arrangement. The two groups of springs c and d thus lie parallel to one another and in the same cylindrical surface and the bar springs of the spring group c extend through slots 51 in the ring-shaped part 49. On the spring arrangement coming into action, the bar springs of both spring groups c, d bend and the connecting element 48 approaches the swinging lever 50, the plane in which the latter swings not altering its position however.

In this constructional form the springs of the two groups of springs c, d may also be arranged in the surface of different bodies of revolution, for instance in concentric cylinders or in conical surfaces disposed one inside the other.

Another means for obtaining a progressive spring action consists in shortening the length of the springs when they bend, for instance by causing them to bear when bending against stops, guiding surfaces or the like, or to bear with greater parts of their length the further they have already been bent.

What I claim is:

1. An arrangement for springing loaded swinging arms for any desired purposes, comprising at least three bar springs of any cross-section which are grouped around a line in such a manner that they are transversely intersected through a plane perpendicular to said line, the said springs carrying the swinging arm and forming a bracket of substantially great rigidity in each transverse direction and the said line constituting a hypothetical axis of oscillation with secured position and around which the swinging arm swings whereupon the said bar springs are subjected to torsion and at least in an essential part to bending.

2. A spring arrangement according to claim 1, characterized by the feature that the bar springs have an edge-on cross section radial to the hypothetical axis of oscillation.

3. A spring arrangement according to claim 1, characterized by the feature that the bar springs are arranged in such a manner that they intersect the hypothetical axis of oscillation at an acute angle.

4. A spring arrangement according to claim 1, characterized by the feature that the bar springs are arranged in such a manner that they cross the hypothetical axis of oscillation at an acute angle.

5. A spring arrangement according to claim 1, characterized by the feature that the bar springs are arranged in such a manner that they are parallel to the hypothetical axis of oscillation.

6. A spring arrangement according to claim 1, characterized by the feature that the bar springs are in at least one rotary surface around the hypothetical axis of rotation.

7. A spring arrangement according to claim 1, characterized by the feature that the bar springs are rotatably mounted at least at one end on their longitudinal axis.

8. A spring arrangement according to claim 1, characterized by the feature that at least two spring groups are connected together by at least one movable element which takes up the shortening of the bar springs caused by the bending of the latter.

9. A spring arrangement according to claim 1, characterized by the feature that two spring groups are connected together at one end and extend from this connection substantially in the same direction, the machine part engaging on one spring group.

10. A spring arrangement according to claim 1, in which the member, in which the two ends of the bar springs are mounted, consists of two parts, which while resisting the spring action in the direction of the bar springs are adapted to move relatively to each other for permitting the shortening of the springs when the springing takes place.

11. An arrangement for swinging axles for motor vehicles comprising at least three bar springs of any cross-section which are grouped around a line in such a manner that they are transversely intersected through a plane perpendicular to said line, the said springs carrying the swinging axle and forming a bracket of substantially great rigidity in each transverse direction and the said line constituting a hypothetical axis of oscillation with secured position and around which the swinging axle swings whereupon the said bar springs are subjected to torsion and at least in an essential part to bending.

WALTHER DOBLHOFF.